United States Patent [19]

Venkat et al.

[11] Patent Number: 4,828,678
[45] Date of Patent: May 9, 1989

[54] CATALYTIC CRACKING

[75] Inventors: Chaya Venkat, Princeton; Darrell D. Whitehurst, Titusville, both of N.J.

[73] Assignee: Mobil Oil Corporation, New York, N.Y.

[21] Appl. No.: 71,246

[22] Filed: Jul. 9, 1987

[51] Int. Cl.$^4$ .................. C10G 11/05; C10G 47/16
[52] U.S. Cl. .................. 208/111; 208/52 CT; 208/120; 208/125
[58] Field of Search ............ 208/120, 111, 52 CT, 208/27, 85, 125, 128; 502/29, 31

[56] References Cited

U.S. PATENT DOCUMENTS

| | | | |
|---|---|---|---|
| 3,692,667 | 9/1972 | McKinney et al. | 208/120 |
| 3,928,172 | 12/1975 | Davis et al. | 208/77 |
| 4,229,282 | 10/1980 | Peters et al. | 208/87 |
| 4,259,174 | 3/1981 | Chen et al. | 208/120 |
| 4,359,378 | 11/1982 | Scott | 208/119 |
| 4,388,176 | 6/1983 | Pratt et al. | 208/87 |
| 4,404,090 | 9/1983 | Castillo et al. | 208/52 CT |
| 4,419,220 | 12/1983 | LaPierre et al. | 585/841 |
| 4,443,327 | 4/1984 | Shihabi et al. | 208/111 |
| 4,448,673 | 5/1984 | Shihabi | 208/120 |
| 4,452,691 | 6/1984 | Polomski | 208/86 |
| 4,501,926 | 2/1985 | LaPierre et al. | 208/111 |
| 4,550,090 | 10/1985 | Degnan et al. | 208/27 |
| 4,619,758 | 10/1986 | Pratt et al. | 208/120 |
| 4,632,748 | 12/1986 | Bertus et al. | 208/52 CT |

Primary Examiner—Anthony McFarlane
Attorney, Agent, or Firm—Alexander J. McKillop; Charles J. Speciale; Malcolm D. Keen

[57] ABSTRACT

In the cataytic cracking of gas oils or heavier feeds, retarded catalyst aging is achieved by adding lighter saturated hydrocarbons such as paraffins and/or cycloparaffins to the feed together with employing a highly siliceous zeolite as the cracking catalyst. The unconverted light hydrocarbon may be recovered and recycled. The invention is applicable to fluid catalytic cracking for the manufacture of gasoline and light fuel oil, and also to the catalytic dewaxing process wherein normal paraffins are selectively cracked to reduce the pour point of a fuel oil or of a lubricant based stock.

18 Claims, 2 Drawing Sheets

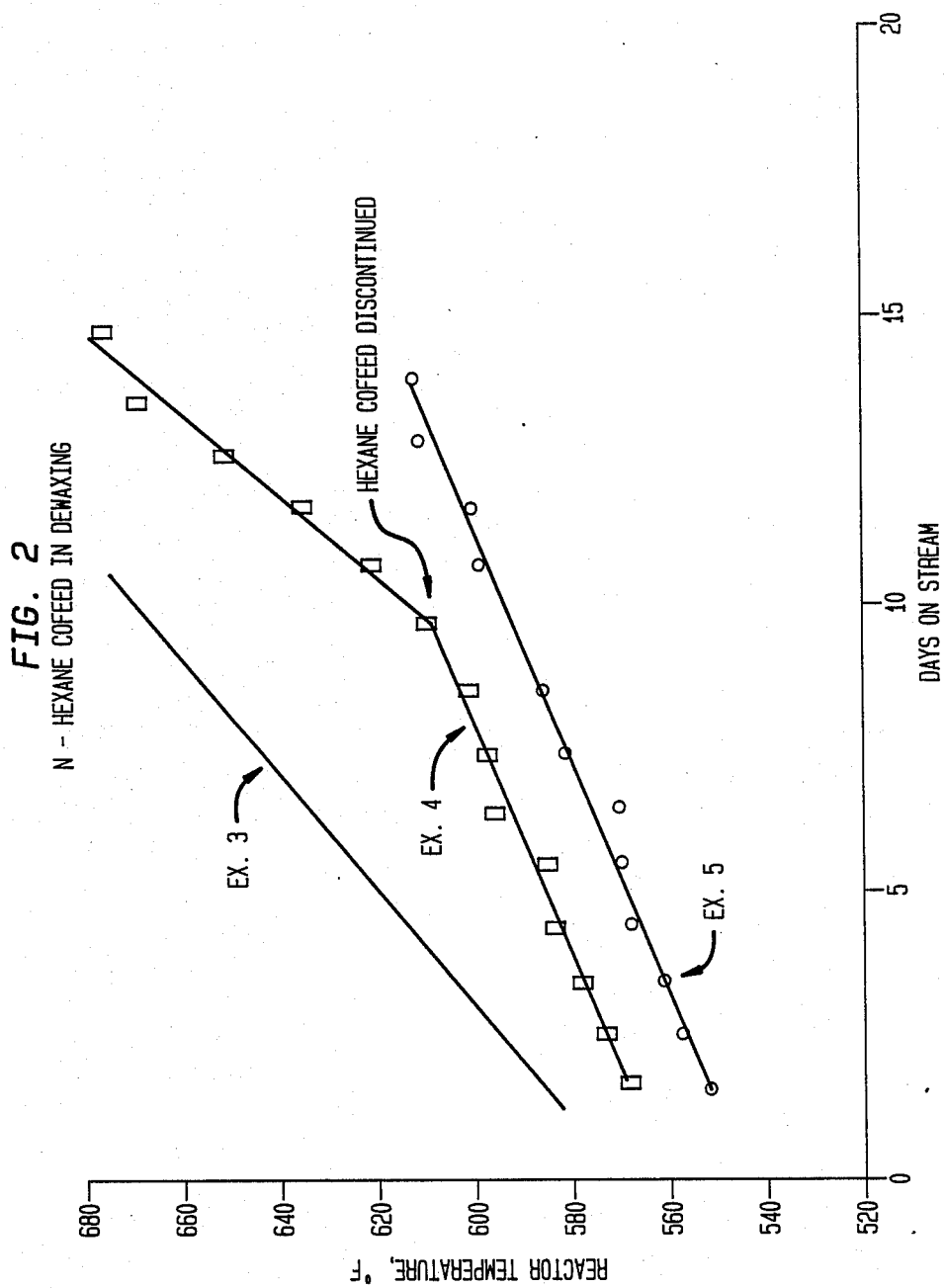

CATALYTIC CRACKING

FIELD OF THE INVENTION

This invention is broadly concerned with catalytic cracking of hydrocarbon feeds boiling above about 350° F. It is more specifically concerned with catalytic cracking of a petroleum feed, such as a gas oil, to make gasoline and/or fuel oil, and with catalytic dewaxing to reduce the pour point of fuel oils or lubricant base stocks.

BACKGROUND OF THE INVENTION

This invention relates to an improvement in catalytic cracking whereby the cracking cycle life of the catalyst is extended for processes such as fluid catalytic cracking, and for catalytic dewaxing wherein a shape-selective catalyst is used.

The catalytic cracking of hydrocarbons, particularly petroleum fractions such as gas oils, to lower molecular weight gasoline and fuel oil products, is well known. This process is practiced industrially in a cycling mode wherein hydrocarbon feedstock is contacted with hot, active solid particulate catalyst without added hydrogen at rather low pressures of up to about 50 psig and at temperatures sufficient to support the desired cracking. As the hydrocarbon feed is cracked, "coke" is deposited on the catalyst particles and the catalyst loses activity and/or selectivity. The coked catalyst is disengaged from the hydrocarbon products, which are then separated into appropriate components. The coked catalyst particles, now cooled by the endothermic cracking and disengaged from the hydrocarbon products, are then contacted with an oxygen containing gas whereupon coke is burned off the particles to regenerate their catalytic activity and/or selectivity. During regeneration, the catalyst particles absorb the major portion of the heat generated by the combustion of coke with consequent increase of catalyst temperature. The heated, regenerated catalyst particles are then contacted with additional hydrocarbon feed and the cycle repeats itself.

Two major variants for the widely practiced cracking of gas oils are fluid catalytic cracking (FCC) and moving bed catalytic cracking, one version of which is known as Thermofor Catalytic Cracking (TCC). In both of these processes as commercially practiced, the feed hydrocarbon and the catalyst are passed through a "reactor"; products and recycle oil are disengaged; the catalyst is regenerated with cocurrent and/or countercurrent air; and the regenerated hot catalyst is contacted with more feed to start the cycle again. These two processes differ substantially in the size of the catalyst particles utilized in each, and also in the engineering of materials contact and transfer which is at least partially a function of the catalyst size. In fluid catalytic cracking (FCC), the catalyst is a fine powder of about 10 to 200 microns, preferably about 70 micron size. In the moving bed process the catalyst is in the shape of beads or pellets having an average particle size of about one-sixty-fourth to one-fourth inch, preferably about one-eight inch. However, the catalyst used in either variant comprise an acidic porous inorganic solid, such as silica-alumina, silica-magnesia, or the like; or an acidic form of a large pore zeolite, such as Zeolite X or Y, in a matrix.

It is important to note at this point that the cracking cycle life of the catalyst, (i.e. the elapsed time between regenerations) in either the FCC-type or the TCC-type operation is very short, regeneration by burning to restore activity and selectivity being required after a contacting period of from about 2 to about 30 minutes. This short cracking cycle life of the catalyst is characteristic of the non-hydrogenative cracking of gas oil feeds in the absence of added hydrogen.

Catalytic cracking has been successfully adapted in recent years to a shape-selective cracking process that has become known as catalytic dewaxing. The catalyst for this process contains, as active component, an intermediate pore size crystalline zeolite such as HZSM-5 which sorbs normal paraffins and certain methyl paraffins that are in the wax range, i.e. that are normally solids at room temperature, and cracks these waxy constituents to lower melting products. The catalytic dewaxing process is very effective for reducing the pour point not only of distillate fuel oils, but also for refined lubricant stocks including those made from vacuum tower distillate fractions or residuums as raw feeds. United States Reissue Patent No. 28,398 to Chen et al. describes and claims catalytic dewaxing, and is incorporated herein by reference as if fully set forth.

The catalytic dewaxing process per se is known and need not be described here in great detail. Its application for distillate fuels has been described, for example, by H. R. Ireland, et al. in "Hydrocarbon Processing", (under the title Distillate Dewaxing) May, 1979, Gulf Publishing Company, Houston, Tex., and is incorporated herein by reference for background purposes. Its application to lubricant manufacture is described, for example, in U.S. Pat. No. 4,259,170 to Graham et al., also incorporated herein by reference. The usual operation for catalytically dewaxing fuels or lubes employs a fixed bed of catalyst, and is normally started at as low a temperature (start-of-run temperature) as will provide a product meeting the target pour point specification. The catalyst activity usually declines relatively fast during the first days on stream, as made evident by an increase in pour point of the dewaxed raffinate, and the decline in activity is compensated by gradually increasing the dewaxing temperature. After some days, a second period may set in, sometimes referred to as the "line-out period", during which catalyst activity declines very slowly and requires a compensatory small increase in temperature, for example, 1° F./day or less. When the temperature reaches a predetermined level (end-of-run temperature) above which the dewaxed product lacks stability or other prerequisites, the run is terminated to allow regeneration of the deactivated catalyst. The term "aging" will be used herein to refer to the catalyst deactivation which occurs either initially or during line-out operation. The term "catalyst cycle life" or "cycle life" as used herein means the length of time that elapses between the start-of-run temperature and the end-of-run temperature.

Although the cracking cycle life of a dewaxing catalyst is much longer than an FCC cracking catalyst, a number of waxy raffinates from different crudes that can be dewaxed by the solvent process are not now efficiently dewaxed catalytically because of a prohibitively short cycle life. Also, waxy raffinates that are now catalytically dewaxed would benefit from a slower rate of deactivation and extended cycle life.

The present invention is not directed to hydrocracking nor is it within the scope of this invention to use pressures of 1500 to 3000 psig which are characteristic for hydrocracking. Hydrocracking essentially involves hydrogenolysis and the hydrocarbon products formed are free of olefins and substantially richer in hydrogen content than the feed. In contrast, the cracking and dewaxing processes referred to herein produce some olefins, and the overall composition of the reactor effluent is substantially the same as that of the feed, i.e. the mol ratio of hydrogen to carbon is substantially unchanged.

BRIEF SUMMARY OF THE INVENTION

We now find that catalyst aging is retarded in a catalytic cracking process whenever the catalyst comprises a crystalline zeolite selected from the group consisting of large pore size crystalline zeolites and intermediate pore size crystalline zeolites, each having a silica to alumina mole ratio of at least about 20, and the feed is diluted with a light paraffinic oil prior to contact with said catalyst, all as more fully described hereinbelow.

In the embodiment of this invention wherein the FCC process is used to manufacture gasoline and/or fuel oil, a large pore size crystalline zeolite is used. In another embodiment of this invention wherein a waxy fuel oil or waxy lubricant stock is catalytically dewaxed to produce a low pour point product, an intermediate pore size crystalline zeolite is used to shape-selectively crack waxy paraffins, all as more fully described hereinbelow. The term "waxy" as used herein means a hydrocarbon fraction that contains paraffin waxes and that has a pour point above about 30° F.

DETAILED DESCRIPTION AND SPECIFIC EMBODIMENTS

Figure 1:
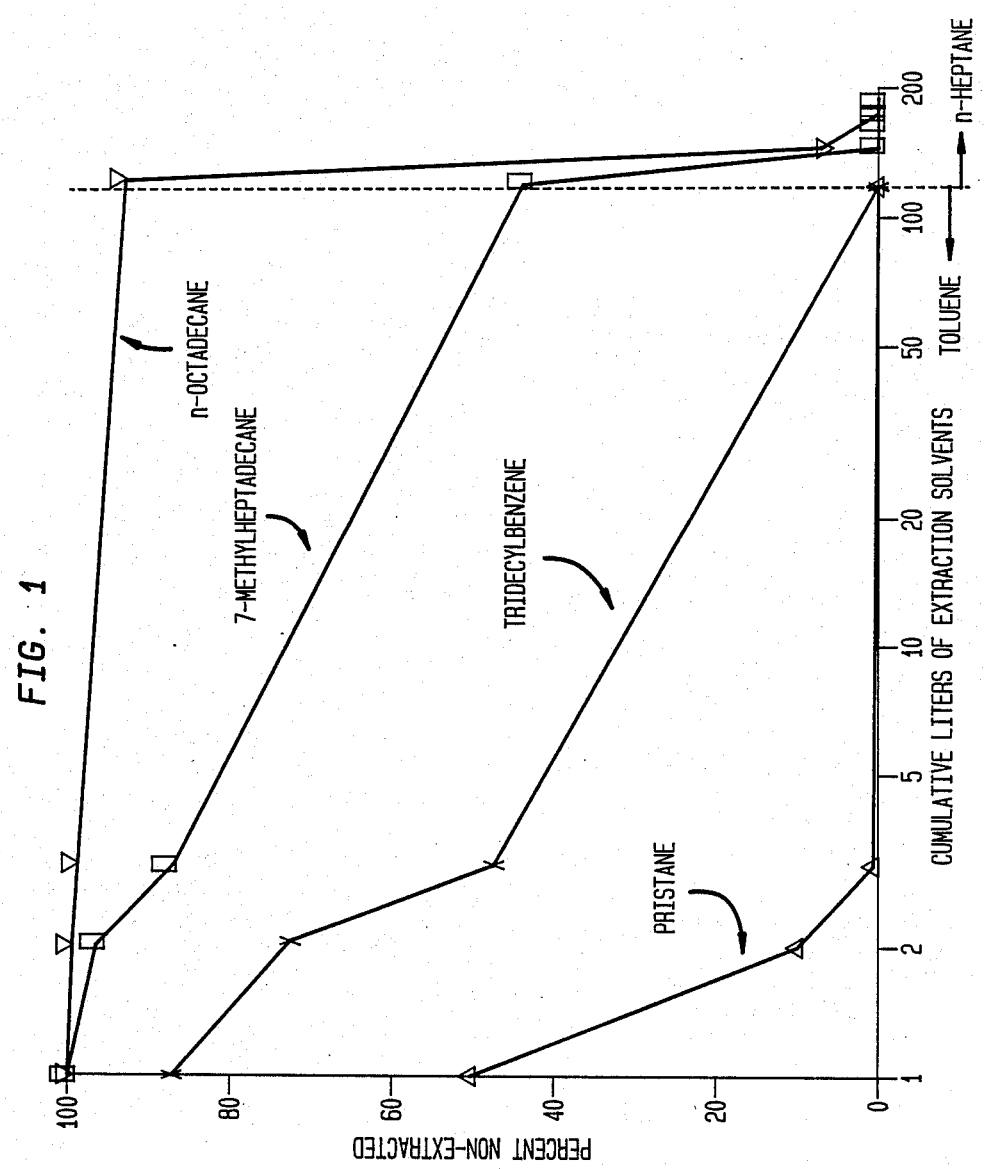

The feed to be processed by the present invention is a hydrocarbon oil boiling above about 350° F. The feed may be obtained from crude petroleum, tar sands, shale oil, or from a hydroprocessed or hydrocracked oil. Suitable feeds, for example, include atmospheric or vacuum distillates, paraffinic raffinates prepared by solvent extraction of such distillate fractions, and deasphalted residual oils. Among lubricant stocks, particularly advantageous results are obtained with heavy neutral raffinates which usually boil from 875° F. to 1025° F., and with bright stock raffinates which are prepared by solvent deasphalting and solvent extracting a 1050 plus vacuum resid.

An important requirement for the process of this invention is that the solid acidic catalyst contain, as an active cracking component, a crystalline zeolite selected from the group consisting of large pore size crystalline zeolites and intermediate pore size crystalline zeolites, said crystalline zeolite having a silica to alumina ratio of at least 20:1, preferably at least about 50:1. The large pore size zeolites such as dealuminized mordenite are particularly well suited to fluid catalytic cracking for the manufacture of gasoline and/or fuel oil, whereas the intermediate pore size zeolites, exemplified by ZSM-5, are useful for shape-selective cracking of waxy feeds to reduce the pour point. As more fully described hereinunder, large pore zeolites are characterized by a Constraint Index of about 0.5, while the intermediate pore size zeolites have a Constraint Index of about 1 to 12.

To retard catalyst aging as provided by the method of this invention, the hydrocarbon feed boiling above 350° F. is diluted prior to catalytic conversion with a light paraffinic oil boiling within the range of 31° F. to about 300° F., and preferably within the range of about 80° F. to about 260° F. As used in the present specification and claims, the term "light paraffinic oil" means a hydrocarbon oil that contains at least 50 wt % paraffins, and preferably at least 70 wt % paraffins, said oil being substantially free of olefins (i.e. containing not more than 2 wt % of olefins).

Suitable sources for the light paraffinic oil include natural gasoline and the more paraffinic straight-run gasolines such as obtained from Arabian Light crude. Such gasolines are substantially free of olefins, and contain a high content of normal paraffins, which is desirable. Gasoline formed in catalytic cracking is usually not suitable because of its high content of olefins, but it may be made useful by hydrogenation to convert the olefins to paraffins. Gasolines from a fuels hydrocracker are also useful as a source of the light paraffinic oil. Practical distillation cuts are directly useful in the method of this invention, and are the least expensive way and therefore the preferred way of isolating a suitable light paraffinic oil. Practical distillation is capable of isolating a cut consisting essentially of normal hexane as a particularly preferred paraffinic oil. Normal paraffins, such as n-heptane, n-octane and n-nonane when desired, are obtainable from a molecular sieve extraction process.

Catalyst aging in any cracking process is often ascribed, at least in part, to impurities in the waxy raffinate feed. While not wishing to be limited by theory, it seems reasonable to assume that certain of the organic compounds that have nitrogen, oxygen or sulfur in their structure interact with and deactivate the acidic sites of the catalyst; and, that these and/or other impurities function as coke precursors to form deposits of carbonaceous catalyst residues. Regardless of the mechanism of deactivation, the catalyst can be periodically regenerated either by treatment with hydrogen gas at high temperature or by combustion with elemental oxygen. The retardation of aging by the method of this invention is believed to depend on the special affinity of the internal pore structure of crystalline zeolites having a high silica to alumina ratio for certain hydrocarbon types, as will be illustrated by example. In particular, for a ZSM-5 structure, for example, normal paraffins are very tenaciously sorbed compared to a simple, sorbable aromatic structure such as toluene; and, that this affinity prevents facile access of the surface to heteroatom impurities and coke precursors, thereby retarding aging. Supplementing the normally occurring complement of protective hydrocarbons by adding to the feed lower molecular weight (and less reactive) protective hydrocarbons results in the retardation of aging by the method of this invention.

It is generally recognized by one skilled in the art that paraffins having more than 10 carbon atoms are relatively easily cracked to lower molecular weight hydrocarbons when contacted with an acidic catalyst, and that the reaction proceeds with very little disproportionation to paraffins of higher molecular weight than the charge. It is also generally known that as the molecular weight of the charged paraffins decreases, so does its ease of conversion to cracked products. Thus, it will be recognized by one skilled in the art that the light paraffinic oil diluent of this invention will in general be more resistant to cracking than the feed, and that at least its lower molecular weight components will remain present during the cracking reaction. It is contemplated to recover and recycle the unconverted light paraffinic oil.

In the embodiment of this invention wherein catalytic dewaxing is practiced, a light paraffinic oil consisting of at least about 75 wt % normal paraffins and boiling within the range of about 80° F. to 260° F. is particularly effective in retarding aging and therefore is preferred. Particularly preferred as light paraffinic oil is the fraction consisting of at least about 90 wt % normal hexane, which remains unconverted in the usual dewaxing operation. This unconverted normal hexane may be recovered from the product stream by means known to those skilled in the art and used as recycle.

All references made herein to silica to alumina ratio of the crystalline zeolite refer to framework compositions, and are meant to exclude aluminum in the pores or binder.

It is known that large pore size crystalline zeolites porvide relatively little control over the critical cross section (molecular size) of the molecules having access to the internal structure of the zeolite, and that such zeolites are suited to the overall boiling point reduction sought in catalytic cracking for gasoline and fuel oil. On the other hand, intermediate pore size zeolites permit free access and egress to the internal structure of only relatively "thin" molecules such as normal paraffins and singly methyl-branched paraffins. Wax molecules, however, fall into just such category, and the intermediate pore size crystalline zeolites are ideally suited to shape-selectivity cracking of waxes to reduce pour point.

A convenient measure of the extent to which a zeolite provides control to molecules of varying sizes to its internal structure is the Constraint Index of the zeolite. Zeolites which provide a highly restricted access to and egress from its internal structure have a Constraint Index value of more than 12. Zeolites of this kind usually have pores of small size, e.g. less than 5 angstroms. On the other hand, zeolites which provide relatively free access to the internal zeolite structure have a Constraint Index of about 0.5, and have pores of large size, e.g. greater than 8 angstroms. Intermediate pore size crystalline zeolites have a Constraint Index of 1–12. The method by which Constraint Index is determined is described fully in U.S. Pat. No. 4,016,218, incorporated herein by reference for details of the method. Constraint Index (CI) values for some typical materials are:

|  | CI | (at test temperature) |
| --- | --- | --- |
| ZSM-4 | 0.5 | (316° C.) |
| ZSM-5 | 6–8.3 | (371° C.–316° C.) |
| ZSM-11 | 5–8.7 | (371° C.–316° C.) |
| ZSM-12 | 2.3 | (316° C.) |
| ZSM-20 | 0.5 | (371° C.) |
| ZSM-22 | 7.3 | (427° C.) |
| ZSM-23 | 9.1 | (427° C.) |
| ZSM-34 | 50 | (371° C.) |
| ZSM-35 | 4.5 | (454° C.) |
| ZSM-38 | 2 | (510° C.) |
| ZSM-48 | 3.5 | (538° C.) |
| ZSM-50 | 2.1 | (427° C.) |
| TMA Offretite | 3.7 | (316° C.) |
| TEA Mordenite | 0.4 | (316° C.) |
| Clinoptilolite | 3.4 | (510° C.) |
| Mordenite | 0.5 | (316° C.) |
| REY | 0.4 | (316° C.) |
| Amorphous Silica-alumina | 0.6 | (538° C.) |
| Dealuminized Y | 0.5 | (510° C.) |
| Erionite | 38 | (316° C.) |
| Zeolite Beta | 0.6–2.0 | (316° C.–399° C.) |

The above-described Constraint Index is an important definition of those zeolites which are useful in the instant invention. The very nature of this parameter and the recited technique by which it is determined, however, admit of the possibility that a given zeolite can be tested under somewhat different conditions and thereby exhibit different Constraint Indices. Constraint Index seems to vary somewhat with severity of operations (conversion) and the presence or absence of binders. Likewise, other variables, such as crystal size of the zeolite, the presence of occluded contaminants, etc., may affect the Constraint Index. Therefore, it will be appreciated that it may be possible to so select test conditions, e.g. temperature, as to establish more than one value for the Constraint Index of a particular zeolite. This explains the range of Constraint Indices for some zeolites, such as ZSM-5, ZSM-11 and Beta.

It is to be realized that the above CI values typically characterize the specified zeolites, but that such values are the cumulative result of several variables useful in the determination and calculation thereof. Thus, for a given zeolite exhibiting a CI value within the range of 1 to 12, depending on the temperature employed during the test method within the range of 290° C. to about 538° C, with accompanying conversion between 10% and 60%, the CI may vary within the indicated range of 1 to 12. Likewise, other variables such as the crystal size of the zeolite, the presence of possibly occluded contaminants and binders intimately combined with the zeolite may affect the CI. It will accordingly be understood to those skilled in the art that the CI, as utilized herein, while affording a highly useful means for characterizing the zeolites of interest is approximate, taking into consideration the manner of its determination, with the possibility, in some instances, of compounding variable extremes. However, in all instances, at a temperature within the above-specified range of 290° C. to about 538° C., the CI will have a value for any given zeolite of interest herein within the approximate range of 1 to 12.

The class of intermediate pore size crystalline zeolites defined herein is exemplified by ZSM-5, ZSM-11, ZSM-12, ZSM-21, ZSM-23, ZSM-35, ZSM-38, ZSM-48, and other similar materials. U.S. Pat. No. 3,702,886 describing and claiming ZSM-5 is incorporated herein by reference.

ZSM-11 is more particularly described in U.S. Pat. No. 3,709,979, the entire content of which is incorporated herein by reference.

ZSM-12 is more particularly described in U.S. Pat. No. 3,832,449, the entire content of which is incorporated herein by reference.

ZSM-21 is more particularly described in U.S. Pat. No. 4,046,859, the entire content of which is incorporated herein by reference.

ZSM-23 is more particularly described in U.S. Pat. No. 4,076,842, the entire content of which is incorporated herein by reference.

ZSM-35 is more particularly described in U.S. Pat. No. 4,016,245, the entire content of which is incorporated herein by reference.

ZSM-38 is more particulary described in U.S. Pat. No. 4,046,859, the entire content of which is incorporated herein by reference.

The specific zeolites described above, when prepared in the presence of organic cations, are substantially catalytically inactive, possibly because the intra-crystalline free space is occupied by organic species from the forming solution. These organic templates are removed by heating in an inert atmosphere at 1000° F. for one hour, for example, followed by base exchange with ammonium salts followed by calcination at 1000° F. in air.

This invention will now be illustrated by examples which, however, are not to be construed as limiting the scope thereof, which scope is defined by this entire specification including appended claims. All parts and proportions are by weight unless explicitely stated to be otherwise.

EXAMPLE 1

To demonstrate the feature of selective sorption of paraffins by HZSM-5 we conducted the following experiment. 245 grams of a furfural extracted raffinate of Arabian Light resid were dissolved in 750 cc. of toluene at 62° C., and 900 grams of a ZSM-5 extrudate dewaxing catalyst were added. The catalyst comprised 65 wt % ZSM-5 and 35 wt % alumina binder.

The mixture was allowed to equilibrate overnight and the extraneous liquid was separated. The catalyst was then extracted in a heated Soxhlet apparatus at 70° C. until no more material could be removed from the catalyst by toluene. This represented a cumulative extraction of over 50 liters of toluene. The extraction solvent was then changed to heptane and extraction continued. Within the first few liters of extraction a substantial amount of waxy paraffinic material was recovered from the catalyst. Elemental analysis of the hexane extract was found to be 14.1% H, 0.3% S, and about 27 ppm N. The initial toluene extract was 13.4% H, 1.2% S, and 54 ppm N. Thus, the heteroatomic molecules were concentrated in the non-preferentially sorbed material and the preferentially sorbed materials were indeed paraffinic in nature and contained few heteroatomic impurities. These paraffins could not be displaced by aromatic solvents but were easily displaced by light paraffinic solvents that had comparable sorption properties.

EXAMPLE 2

Example 1 was repeated with molecular tracers added to the raffinate. These tracers consisted of pristane, tridecylbenzene, 7-methylheptadecane, and n-octadecane. On extraction with toluene the following was observed: Pristane did not sorb very well, as it was geometrically too large to enter the ZSM-5 pore system. What little was associated with the catalyst was easily desorbed, after extraction with only about 3 liters of toluene. Tridecylbenzene and 7-methylheptadecane were both sorbed, but could be reextracted by toluene. 7-methylheptadecane extracted much more slowly than tridecylbenzene. It took only 3 liters of toluene to extract out 50% of the adsorbed tridecylbenzene, but over 75 liters of toluene extraction were needed to extract 50% of the more paraffinic 7-methylheptadecane. Octadecane could not be extracted to any significant extent by toluene even after use of about 150 liters of toluene. But it was immediately desorbed when the extracting solvent was changed to heptane. This again demonstrates the strong preferential sorption of linear paraffins by the HZSM-5 pore system. The results of this example are shown graphically in FIG. 1 of the drawing.

EXAMPLES 3-5

Statfjord 700 SUS Heavy Neutral was the feedstock used in this study. It contained 110 ppm nitrogen, 0.19% sulfur and a pour point of about 120° F. All of the runs were performed at 0.5 LHSV on the Heavy Neutral. Where a hexane co-feed was employed, the overall feed rate was adjusted such that the LHSV based on the Heavy Neutral remained unchanged at 0.5, as in the base case. Example 3 was run without hexane co-feed. Example 4 was with 20 wt % added n-hexane for 10 days followed by discontinuance of hexane. Example 5 was with 30 wt % of n-hexane.

Dewaxing was done in a continuous micro reactor with an L:D ratio of about 10. The catalyst was a steamed Ni-ZSM-5 extrudate crushed and sized to 20/40 mesh. 3.2 gms (6 cc) of the sized catalyst was used in a stainless steel reactor (0.375" OD, 0.305" ID). A three zone furnace was used for uniform temperature control. Feed and hexane co-feed delivery were via separate Isco pumps (except in the case of the 20% co-feed experiment, where waxy feed and hexane were blended ahead of time and fed to the reactor via a Milton Roy pump). The pressure was 400 psig for Example 3 and raised to 480 psig in Examples 4-5 with hexane co-feed, in order to keep the hydrogen partial pressure at 400 psig. The hydrogen flow rate in all cases was 2500 scf/barrel.

Pour points were measured each morning by the Herzog auto pour method. Based on the pour point obtained, the reactor temperature was corrected for the target pour of 20° F., using a correction factor of $-2°$ F. pour/ 1° F. reactor. Reactor temperature was continuously monitored and equilibrium was established at the new temperature within one hour. Product samples collected within the first 8 hours after a temperature change were discarded as line-out material.

The lube fraction of the products was collected at atmospheric pressure in a hot collection vessel maintained at 400° F. The light naphtha (plus unreacted hexane, in the co-feed experiments) was collected in glass cold traps maintained at 15° F. Subsequent gas chromatographic analysis of the lube fractions verified the efficiency of this auto distillation and assured that the co-feed did not affect the pour point measurement.

Effluent gas samples were collected and analyzed by a Carle Refinery Gas Analyzer and associated software. Total mass balances (feed+hexane) were typically between 96-103%. Hexane mass closure was complicated by its smaller feed rate and the fact that not all of the hexane was trapped by the cold traps and it was therefore partitioned between the naphtha and gas samples. Mass balances on hexane ranged from 90-110%. The results of Examples 3-5 are shown in FIG. 2 of the drawing.

What is claimed is:

1. A method for retarding catalyst aging in the catalytic cracking of a hydrocarbon feed boiling above about 350° F., said method comprising:

mixing 100 parts of said hydrocarbon feed boiling above about 350° F. with about 10 to 50 parts of a light paraffinic oil boiling within the range of 31° F. to about 300° F., said paraffinic oil being substantially free of olefins;

contacting under cracking conditions and at a total pressure of 0 to 1000 psig said mixture and a solid acidic catalyst comprising a crystalline zeolite selected from the group consisting of large pore size crystalline zeolites and intermediate pore size crystalline zeolites, said crystalline zeolite having a silica to alumina ratio of at least 20:1, and forming cracked products and deactivated catalyst that contains a carbonaceous residue; and, regenerating said deactivated catalyst.

2. The method described in claim 1 wherein said hydrocarbon feed is a petroleum fraction, said pressure is up to about 50 psig, said crystalline zeolite is a large pore size crystalline zeolite with a Constraint Index of about 0.5, and including the step of recovering gasoline, or mixtures thereof fuel oil from said cracked products.

3. The method described in claim 1 wherein said hydrocarbon feed is a waxy petroleum fraction, said crystalline zeolite is an intermediate pore size crystalline zeolite with a Constraint Index of about 1 to 12, and including the step of recovering a dewaxed oil having a pour point substantially lower than said waxy petroleum fraction.

4. The method of claim 3 wherein said paraffinic oil consists essentially of normal hexane.

5. A method for retarding catalyst aging in the shape-selective catalytic dewaxing of a waxy hydrocarbon feed boiling above about 350° F., said method comprising:
mixing 100 parts of said waxy hydrocarbon feed boiling above about 350° F. with about 10 to 50 parts of a light paraffinic oil boiling within the range of 31° F. to about 300° F., said paraffinic oil being substantially free of olefins;
contacting said mixture under dewaxing conditions with a solid acidic catalyst comprising an intermediate pore size crystalline zeolite having a Constraint Index of 1 to 12 and a silica to alumina ratio of at least 20:1, and forming cracked products and deactivated catalyst that contains a carbonaceous residue; and,
regenerating said deactivated catalyst.

6. The method described in claim 5 wherein said waxy hydrocarbon feed is a petroleum oil selected from the group consisting of a distillate fuel oil, a distillate lubricating oil fraction and a deasphalted vacuum residuum, and said crystalline zeolite has a silica to alumina ratio of at least 50:1.

7. The method described in claim 6 wherein said light paraffinic oil boils within the range of 80° F. to 260° F.

8. The method described in claim 5 wherein said step of contacting said feed is conducted in the presence of hydrogen gas, and said crystalline zeolite has the structure of ZSM-5 or ZSM-11, or ZSM-23.

9. The method described in claim 8 wherein said waxy hydrocarbon feed is a petroleum oil selected from the group consisting of a distillate fuel oil, a distillate lubricating oil fraction and a deasphalted vacuum residuum, and said crystalline zeolite has a silica to alumina ratio of at least 50:1.

10. The method described in claim 9 wherein said light paraffin oil consists essentially of normal hexane.

11. A method for catalytically dewaxing a petroleum feed in which catalyst aging is retarded 650° F. or a deasphalted vacuum residuum;
(b) mixing 100 parts of said feed with 10 to 50 parts of a light paraffinic oil boiling within the range of 31° F. to 300° F., said paraffinic oil being substantially free of olefins;
(c) contacting said mixture and hydrogen gas at a space velocity, LHSV of about 0.5 to 1.5 based on said feed with a dewaxing catalyst comprising a crystalline zeolite having the structure of ZSM-5 or ZSM-11 or ZSM-23 at 300–800 psig reactor pressure, 500° F.–800° F. reactor temperature, and 1000 to 3500 scf/bbl hydrogen circulation, said crystalline zeolite having a silica to alumina ratio of at least 20:1; and,
(d) recovering a dewaxed petroleum oil having a substantially lower pour point than said feed.

12. The method described in claim 11 wherein said selected feed is a distillate fuel oil fraction.

13. The method described in claim 11 wherein said selected feed is a solvent-refined lube fraction boiling above about 650° F. or a solvent-refined deasphalted vacuum residuum, and said reactor temperature is about 500° F. to about 700° F.

14. The method described in claim 13 wherein said selected feed is a heavy neutral raffinate.

15. The method described in claim 13 wherein said selected feed is a bright stock raffinate.

16. The method described in claim 14 wherein said light paraffinic oil consists essentially of normal hexane.

17. The method described in claim 15 wherein said light paraffinic oil consists essentially of normal hexane.

18. The method described in claim 8 or 9 or 10 or 11 or 13 or 15 or 14 or 16 or 17 wherein said crystalline zeolite has the structure of ZSM-5.

* * * * *

UNITED STATES PATENT AND TRADEMARK OFFICE
CERTIFICATE OF CORRECTION

PATENT NO. : 4,828,678
DATED : May 9, 1989
INVENTOR(S) : Chaya Venkat and Darrell D. Whitehurst It is certified that error appears in the above-identified patent and that said Letters Patent is hereby corrected as shown below:

Col. 1, line 61:   Delete "-eight" and insert --eighth--.

Col. 9, line 7:   Delete "or mixtures thereof fuel oil from" and insert --fuel oil or mixtures thereof from--.

Col. 10, line 10:   Delete "650°F or a deasphalted vacuum residuum;" and insert --comprising the steps of:--;
-- (a) selecting as feed a distillate fraction boiling above 650°F or a deasphalted vacuum residuum;--

Col. 10, line 17:   Delete "j".

Signed and Sealed this

Thirty-first Day of July, 1990

*Attest:*

HARRY F. MANBECK, JR.

*Attesting Officer*      *Commissioner of Patents and Trademarks*